US007814881B2

(12) United States Patent
McRae

(10) Patent No.: US 7,814,881 B2
(45) Date of Patent: Oct. 19, 2010

(54) ENGINE CONNECTING ROD AND CRANKSHAFT ASSEMBLY

(76) Inventor: John E. McRae, 28059 Kendallwood, Farmington Hills, MI (US) 48334

( * ) Notice: Subject to any disclaimer, the term of this patent is extended or adjusted under 35 U.S.C. 154(b) by 212 days.

(21) Appl. No.: 12/214,742

(22) Filed: Jun. 23, 2008

(65) Prior Publication Data

US 2009/0314247 A1 Dec. 24, 2009

(51) Int. Cl.
*F16C 11/02* (2006.01)

(52) U.S. Cl. ................................ 123/197.4; 123/197.3

(58) Field of Classification Search ............. 123/197.3, 123/197.4; 74/595

See application file for complete search history.

(56) References Cited

U.S. PATENT DOCUMENTS 4,803,890 A * 2/1989 Giuliani et al. ............... 74/131
5,555,777 A * 9/1996 Bell ............................ 74/595
2006/0131798 A1* 6/2006 Kang ...................... 267/141.1

* cited by examiner

*Primary Examiner*—M. McMahon
(74) *Attorney, Agent, or Firm*—John E. McRae

(57) ABSTRACT

A four cycle piston engine has a crankshaft that includes a crank pin and a guide pin rotatable as a unit around the crankshaft rotational axis. The connecting rod has a linear trackway that slidably engages the guide pin so that the rod has linear slidable motion relative to the crankshaft. During the power stroke the connecting rod applies a pulling force to the crank pin via a special force-transmitting linkage.

13 Claims, 8 Drawing Sheets

ENGINE CONNECTING ROD AND CRANKSHAFT ASSEMBLY

FIELD OF INVENTION

The invention relates to a four cycle piston engine having a connecting rod that delivers the piston energy to a crankshaft in a direction that has a relatively good alignment with the movement direction of the crank pin. The improved alignment produces a relatively high force delivery effectiveness.

DESCRIPTION OF THE RELATED ART

FIG. 3 of the present drawings shows a conventional piston engine that is believed to be the closest prior art. The engine connecting rod is directly connected to a crank pin on the crankshaft for producing crankshaft rotation. In the present invention the connecting rod is slidably guided by a separate guide pin on the crankshaft. A separate force-transmitting mechanism associated with the connecting rod exerts a pulling force on the crank pin to produce crankshaft rotation.

SUMMARY OF THE INVENTION

The present inventions relate to an engine having a crankshaft that includes a crank pin and a guide pin rotatable as a unit around the crankshaft rotational axis. The engine connecting rod is slidable on the guide pin. During the power stroke a force-transmitting mechanism associated with the connecting rod exerts a pulling force on the crank pin to produce crankshaft rotation. The pulling force is closely aligned with the path of the crank pin so that a relatively high percentage of the piston energy is transmitted to the crank pin.

BRIEF DESCRIPTION OF THE DRAWINGS

FIG. 1 is taken on line 1-1 in FIG. 2.

DETAILED DESCRIPTION OF A PREFERRED EMBODIMENT OF THE INVENTION

Figure 1:
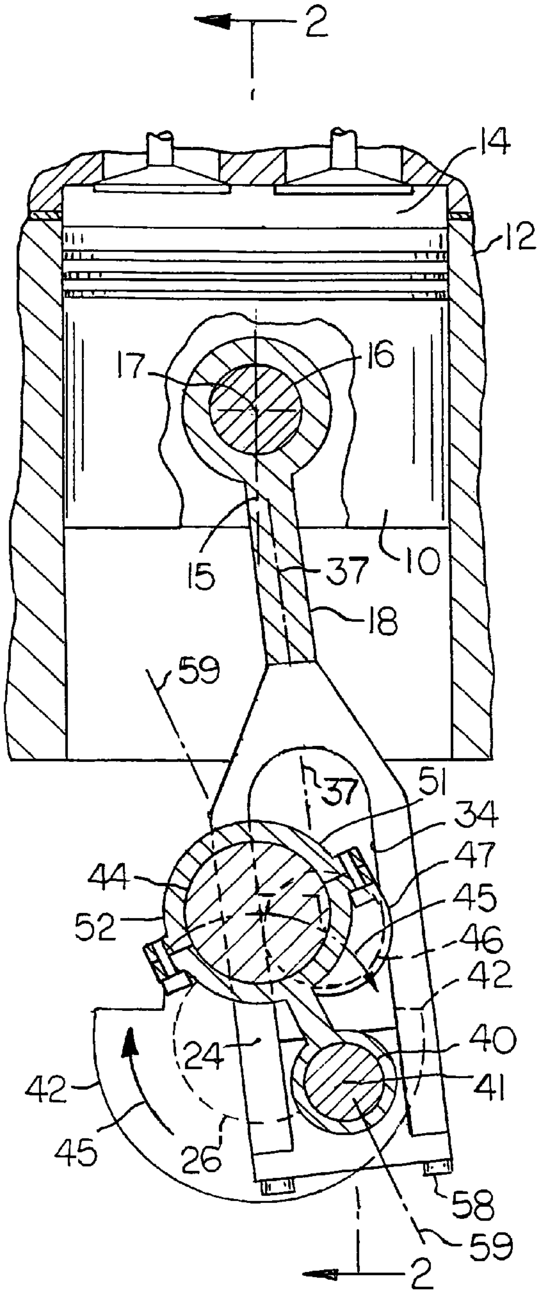
FIG. 1 is a sectional view taken through a four cycle engine embodying the invention.
Figure 2:
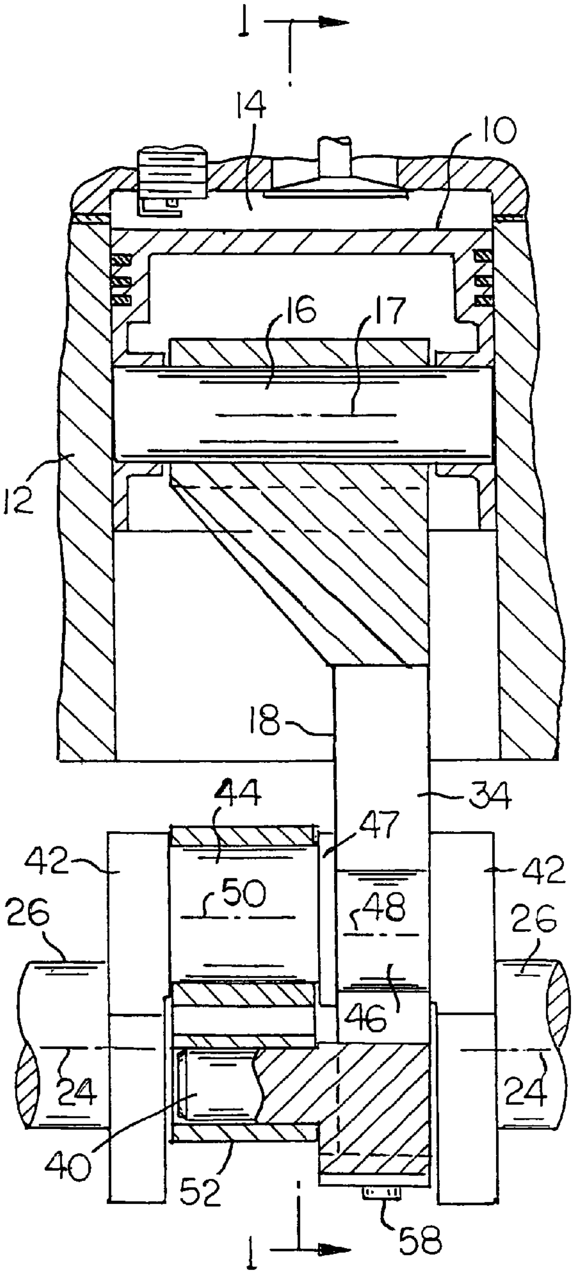
FIG. 2 is a sectional view taken on broken line 2-2 in FIG. 1.
Figure 10:
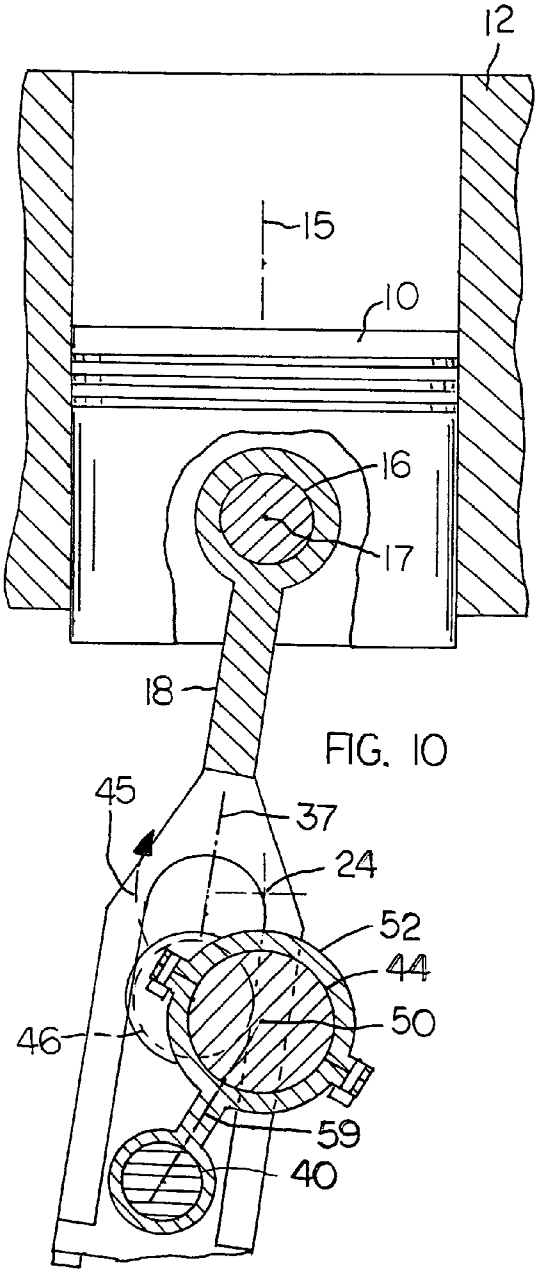
FIG. 10 is a sectional view taken in the same direction as FIG. 1, but showing the engine in the bottom dead center position.

FIGS. 1 and 2 show one cylinder of a four cycle engine embodying the invention. An actual engine could have one or more cylinders, e.g. four cylinders, six cylinders, or eight cylinders. As shown, cylinder 10 slidably supports a piston 12 for reciprocatory motion along centerline 15 between a top dead center position (FIG. 1) and a bottom dead center position (FIG. 10). High pressure gases in combustion chamber 14 power the piston downwardly during the power stroke. Next, the piston is moved upwardly during the exhaust stroke, then downwardly on the intake stroke, and then upwardly on the compression stroke, to complete the four cycles. The engine can be a spark ignition engine or a compression ignition engine.

Figure 3:
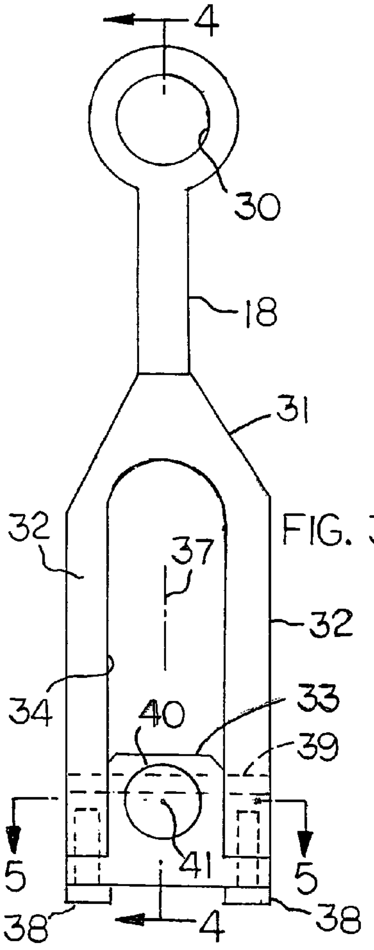
FIG. 3 is an elevation view of a connecting rod used in the FIG. 1 engine.
Figure 4:
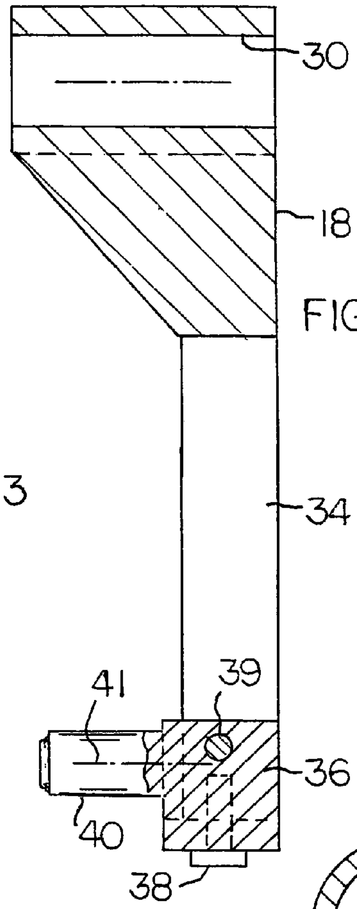
FIG. 4 is a sectional view taken on line 4-4 in FIG. 3.
Figure 5:
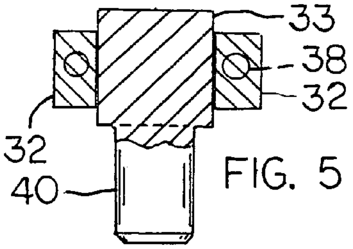
FIG. 5 is a sectional view taken on line 5-5 in FIG. 3.

Piston 12 has a removable piston pin 16 that pivotally supports a connecting rod 18 for swinging motion around pin axis 17 located on centerline 15. FIGS. 3, 4 and 5 show connecting rod 18 in a separated condition. The rod comprises a major component 31 and a smaller minor component 33. Major component 31 has a bore 30 at its upper end adapted to rotatably fit on piston pin 16, and two elongated parallel spaced arms 32 that form a linear track way 34 having a centerline 37. Minor component 33 comprises a block 36 adapted to fit on the lower ends of spaced arms 32, and an integral hinge pin 40. Pin 40 has an axis 41 that intersects centerline 37 when block 36 is fastened to arms 32 by fastener screws 38 and 39.

Track way 34 is adapted to slidably fit on a circular guide pin 46 that is part of a crankshaft 22. Crankshaft 22 is shown in a separated condition in FIGS. 6 and 7. The crankshaft includes two spaced crank and arms 42, a circular crank pin 44 extending from one of these arms, a contiguous circular guide pin 46 connected to the other crank arm, and a bridge section 47 that acts as reinforcement for the pins. Each pin has an extension 49 that extends into a bore in the associated crank arm for securing the pin assembly to the crank arms. Extensions 49 can be joined to crank arms 42 by welding or by a thermal shrink process. Alternately, pins 44 and 46 can be integral with crank arms 42.

FIGS. 1 and 2 show crankshaft 22 integrated into the engine. Crank arms 42 extend right angularly from shaft segments (or journals) 26 that have a common rotational axis 24. Suitable main bearings (not shown) support shaft segments 26 for continuous rotation of the crankshaft around shaft axis 24.

Figure 6:
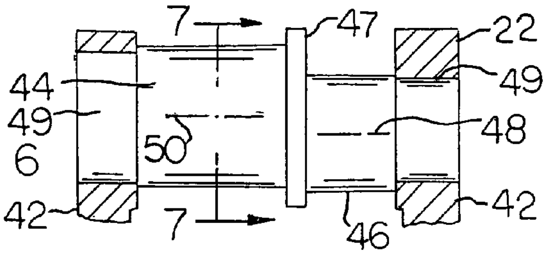
FIG. 6 is a fragmentary side view of a crankshaft employed in the FIG. 1 embodiment.
Figure 7:
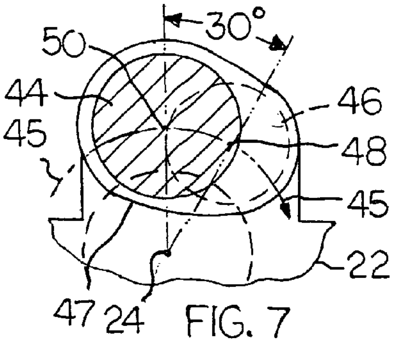
FIG. 7 is a sectional view taken on line 7-7 in FIG. 6.

Referring to FIGS. 6 and 7, guide pin 46 has an axis 48 that leads axis 50 of crank pin 44 by thirty degrees measured in the direction of crankshaft rotation (clockwise) around crankshaft rotational axis 24. Pin axis 48 and pin axis 50 are located on an imaginary circumferential line 45 that defines the arcuate path of pins 44 and 46 around shaft axis 24. Pins 44 and 46 are thus equidistant from axis 24.

Figure 8:
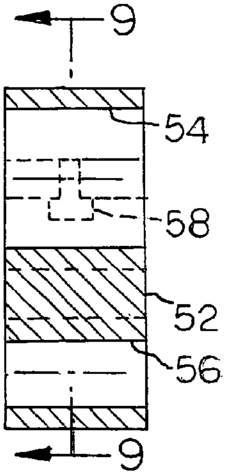
FIG. 8 is a sectional view taken through a force-transmitting link employed in the FIG. 1 engine.
Figure 9:
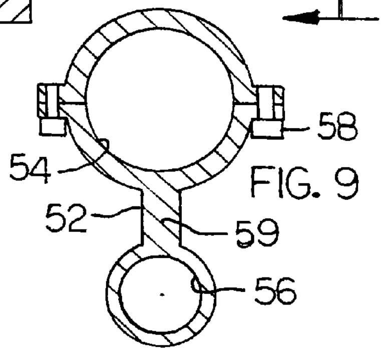
FIG. 9 is a sectional view taken on line 9-9 in FIG. 8.

Referring again to FIGS. 1 and 2, crank pin 44 is operatively connected to hinge pin 40 of the connecting rod by a force-transmitting means 51 that comprises a link 52. As shown in FIGS. 8 and 9, link 52 has a first circular bore 54

(adapted to have a swivel fit on crank pin 44), and a second circular bore 56 (adapted to have a swivel fit on hinge pin 40). The link is made up of two sections that are connected together by fasteners 58.

The process of assembling the various components into the engine initially involves placement of crankshaft 22 in the main bearings, and then assembling link 52 onto crank pin 44 with fasteners 58. Block 36 is separated from the connecting rod, and manipulated so that hinge pin 40 is located within bore 56 of link 52. Piston 10 is connected to connecting rod 18, after which the piston-connecting rod assembly is pushed downwardly in cylinder 10 so that arms 32 of the connecting rod register with block 36. Block 36 is then fastened to the lower ends of arms 32, using fasteners 38 and 39.

In operation of the engine, the power stroke is initiated by the burning gases in combustion chamber 14. Piston 12 is powered downwardly so that connecting rod 18 is moved downwardly while being guided or stabilized by guide pin 46; the rod has limited pivotal motion around axis 17 of piston pin 16. As rod 18 moves downwardly it shifts hinge pin 40 downwardly along the rod centerline 37. Hinge pin 40 on the connecting rod exerts a downwardly angled pulling force on link 52, so that link 52 exerts a clockwise pulling force on crank pin 44, thereby producing crankshaft rotation around axis 24. Centerline 37 of rod 18 forms a force direction line for transferring force from piston pin 16 to hinge pin 40. Link 52 has a second imaginary force direction line 59 that extends through axis 41 of hinge pin 40 and axis 50 of crank pin 44. Axis 41 is an intersection (convergence) point for the connecting rod force direction line 37 and the link force direction line 59.

Figure 11:
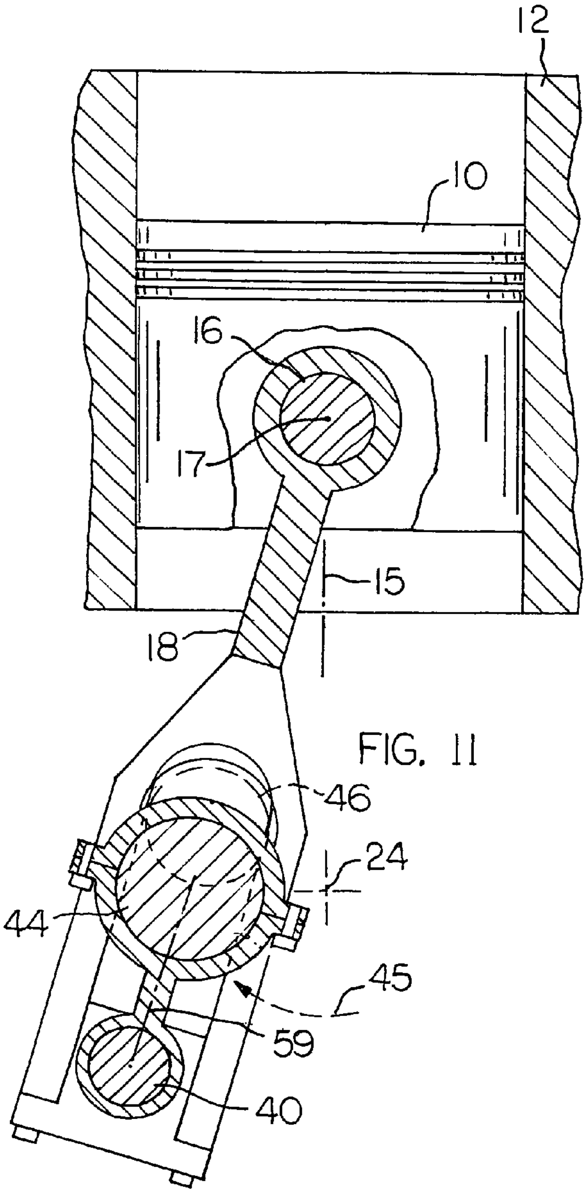
FIG. 11 is a sectional view taken in the same direction as FIG. 1, but showing the engine at two hundred seventy degrees after top dead center.

FIG. 10 shows the mechanisms at the bottom dead center position. During the subsequent clockwise movement of crank pin 44 from the bottom dead center position to the top dead center position (FIG. 1) the crank pin passes through the FIG. 11 position (two hundred seventy degrees after top dead center). The crank pin exerts an upward pulling force on link 52 along force direction line 59. Again, pin 46 guides or stabilizes rod 18.

A principal advantage of the described mechanism is an improved alignment of the driving force direction line 59 with the movement path of crank pin 44, particularly during the power stroke (FIG. 1 to FIG. 10). The improved alignment allows a greater percentage of the piston energy to be directed into crank pin 44 (when compared with a conventional arrangement depicted in FIG. 13).

FIG. 16A through FIG. 16D illustrate diagrammatically how force direction line 59 relates to crank pin 44 movement along direction line 65 at four different crank pin positions, namely plus ten degrees, plus twenty degrees, plus thirty degrees, and plus forty degrees after top dead center. These four crank pin positions occur when the combustion chamber pressure is relatively high, i.e. when energy losses in the force-delivery process are most detrimental to overall engine efficiency.

Figures 16A, 16B, 16C, 16D:
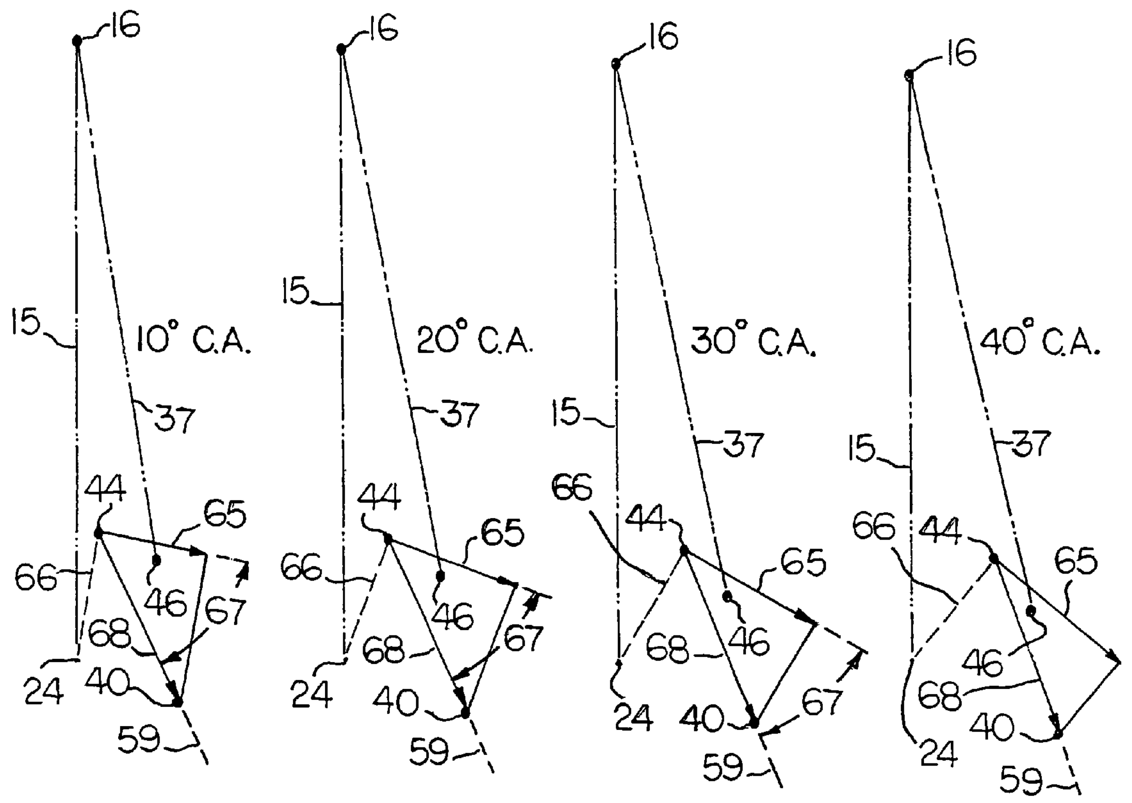
FIGS. 16A through 16B diagrammatically show force direction relationships during the power stroke of an engine embodying the present invention.
Figure 17A:
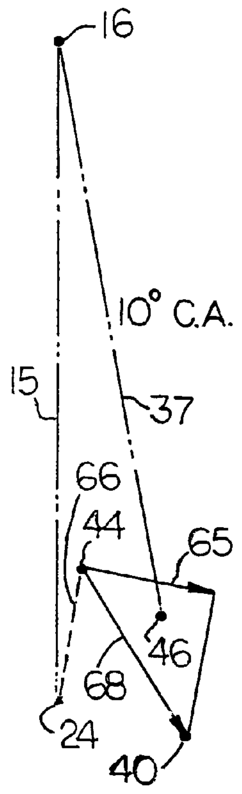
FIG. 17A through FIG. 17D show force direction relationships for another engine embodying the invention.
Figure 17B:
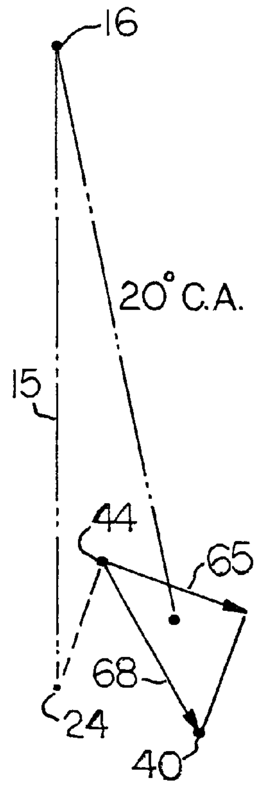
Figure 17C:
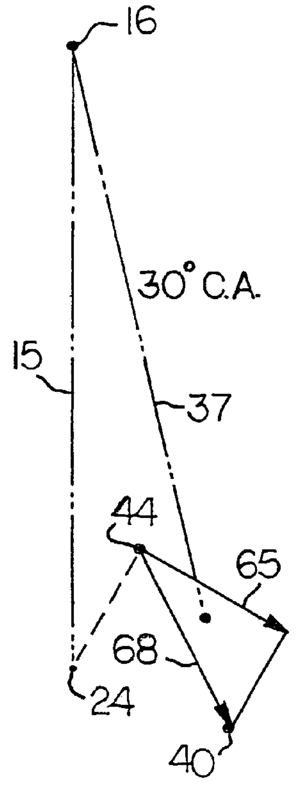
Figure 17D:
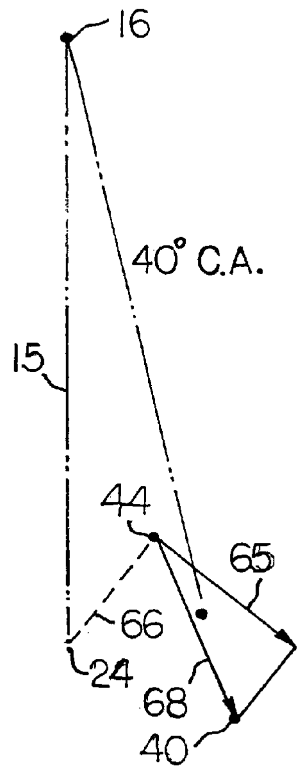

In FIG. 16A line segment 65 references the path of crank pin 44 ten degrees after top dead center. Line 65 is located normal to an imaginary radial line 66 generated from crankshaft rotational axis 24. The length of line segment 65 is a measure of the piston energy effective along the pin movement path.

In FIG. 16A line segment 68 references the energy delivered to the crank pin along force direction line 59 (i.e. by force transmitting link 52). The lengths of line segments 65 and 68 are arbitrary but proportionate; the line segments are connected by a line that parallels radial line 66 to form a right angle triangle. Radial line 66 establishes a base line for measuring the energy values of line segments 65 and 68. The effectiveness of the force delivery action is calculated as the cosine of the included angle 67 between line segments 65 and 68, i.e. the ratio of the respective line segment lengths. In FIG. 16A the ratio is 0.57, which translates to a force delivery effectiveness of 57%.

During the power stroke, included angle 67 changes. As angle 67 decreases the force delivery effectiveness increases. When line segments 65 and 68 are coincident the force delivery effectiveness is 100%.

In FIG. 16B (20 degrees ATDC) the force delivery effectiveness is 73%. In FIG. 16C (30 degrees ATDC) the force delivery effectiveness is 80%. In FIG. 16D (40 degrees ATDC) the force delivery effectiveness is 87%.

Figure 14:
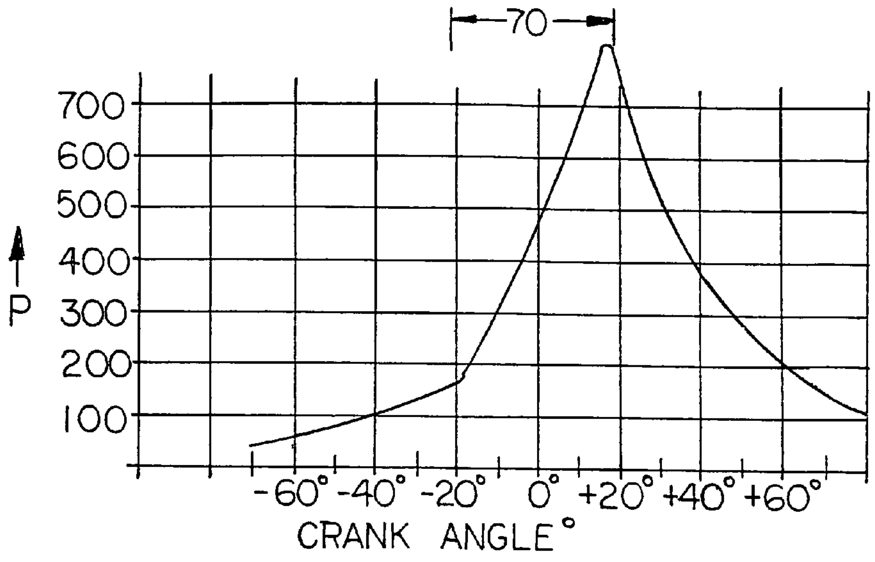
FIG. 14 is a graph generically depicting combustion chamber pressure versus crank angle for the engines depicted in FIGS. 1 and 13.

FIG. 16A through 16D are taken when the combustion chamber pressure is relatively high (i.e. during the fuel burning period and shortly thereafter). This time interval is important when considering overall engine performance. FIG. 14 shows generally how combustion chamber pressure varies in a typical (generic) engine. In FIG. 14, numeral 70 designates the firing interval between ignition and complete combustion (about forty crank angle degrees). High combustion chamber pressures occur between about zero degrees (top dead center) and forty degrees after top dead center (ATDC). The present invention is directed toward achievement of high force delivery efficiencies at the high combustion chamber pressures when efficiencies are most important.

Figure 12:
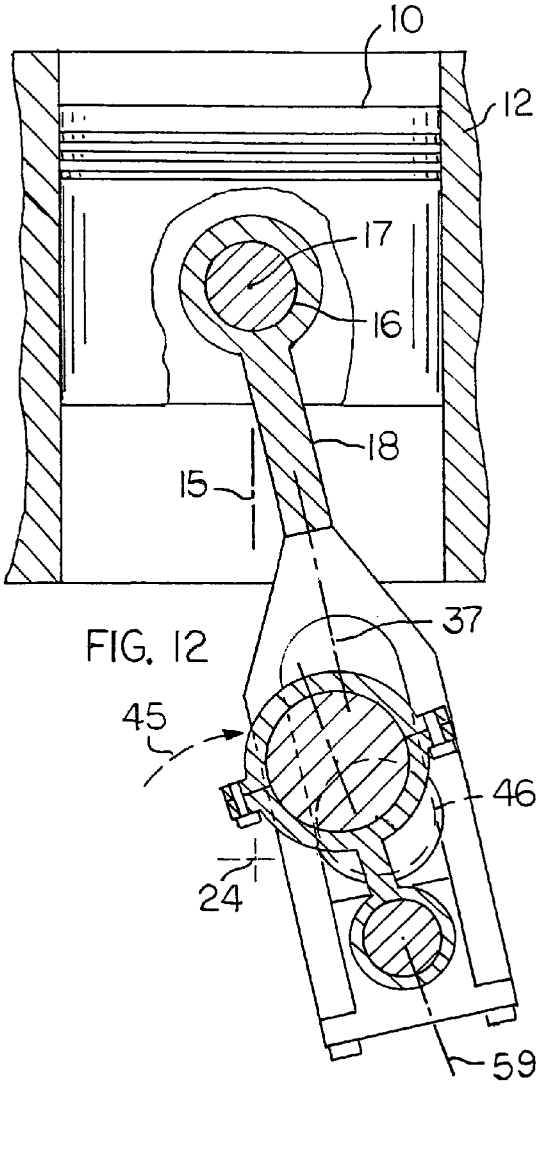
FIG. 12 shows the FIG. 1 engine at forty degrees after top dead center.
Figure 13:
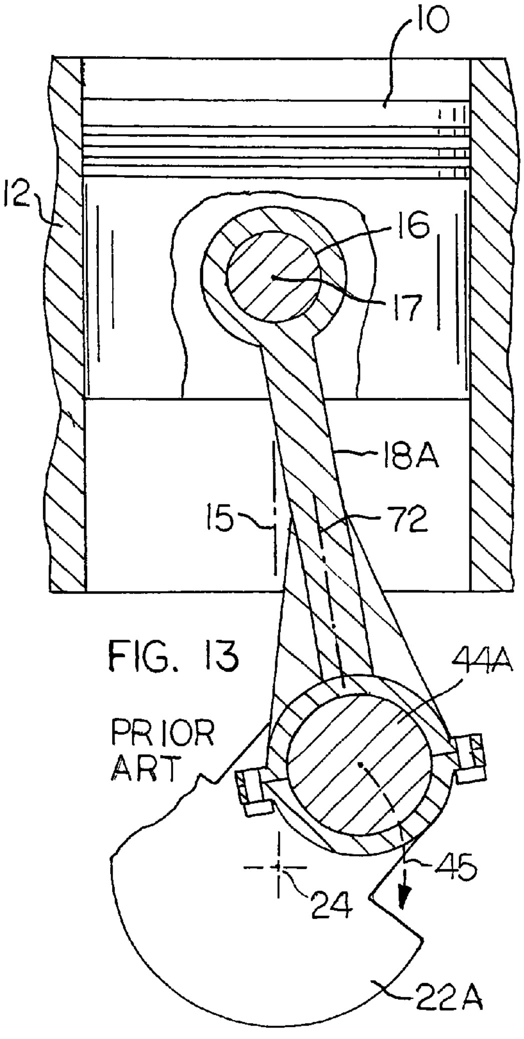
FIG. 13 shows a conventional prior art engine at forty degrees after top dead center.

FIG. 13 shows a conventional piston engine that includes a slidable piston 12 having a piston pin 16 connected to a connecting rod 18A. The lower end of rod 18A has a swivel connection to a crank pin 44A on crankshaft 22A. Rod 18A delivers a driving force to crank pin 44A along force direction line 72. FIG. 13 shows the engine at plus forty degrees ATDC. For comparison, an engine of the present invention is shown in FIG. 12 at the same crank pin position (forty degrees ATDC). It will be noted that the force direction lines 72 and 59 for the respective engines are differently oriented to the crank pin path; the force delivery effectiveness percentages are different for the two engines.

FIGS. 15A through 15D illustrate diagrammatically how force direction line 72 for the conventional engine (FIG. 13) relates to the crank pin movement direction at four different crank pin positions, namely ten degrees ATDC, twenty degrees ATDC, thirty degrees ATDC, and forty degrees ATDC. The force delivery effectiveness ratio is the cosine of included angle 67A between line segment 65 and line segment 74 (along force direction line 72).

Figures 15A, 15B, 15C, 15D:
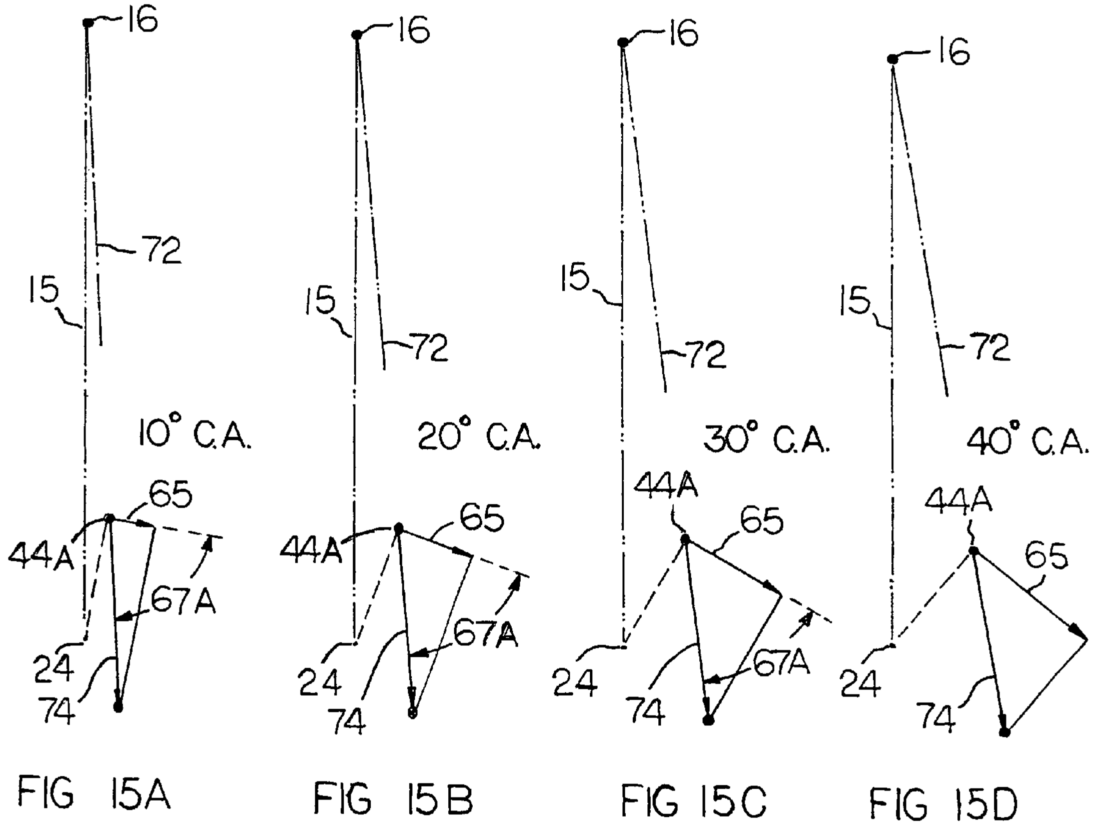
FIGS. 15A through 15D diagrammatically illustrate force direction relationships during the power stroke of the conventional engine shown in FIG. 13.

In FIG. 15A (ten degrees ATDC) the force delivery effectiveness ratio is 0.23 (23% effectiveness percentage). For FIGS. 15B through 15D the effectiveness percentages are, respectively, 43%, 60%, and 70%. These percentages are measurably lower than percentages obtained with the invention structure (FIGS. 16A through 16D).

In the FIG. 1 construction, guide pin 46 leads crank pin 44 by thirty degrees, measured around shaft axis 24. Other lead angles can be used. FIGS. 17A through 17D show force angle relationships when guide pin 46 leads crank pin 44 by forty degrees. The reference numerals in FIGS. 17A through 17D are the same as those used in FIGS. 16A through 16D. The force delivery effectiveness percentages are measured as 67% (for FIG. 17A), 77% (for FIG. 17B), 87% (for FIG. 17C, and 90% (for FIG. 17D).

Although not shown in the drawings, the force delivery effectiveness percentage at top dead center (i.e. zero degrees ATDC) is zero % for the conventional engine. With the conventional engine at top dead center the force direction line 72 is coincident with piston centerline 15 so that the force is delivered normal to the crank pin path 65, resulting in zero force delivery to crank pin 44A. With the construction depicted in FIG. 1, when crank pin 44 is at top dead center the force direction line 59 is very near the orientation shown in FIG. 16A, so that a substantial percentage of the piston energy is effectively delivered to the crank pin (40%). A similar condition occurs when the crank pin in the construction of FIG. 17A through FIG. 17D is at top dead center (57%).

An incidental advantage of the invention is that when crank pin 44 is at or near top dead center the force direction line 59 has a substantial angulations' relative to piston centerline 15 and centerline 37 for connecting rod 18. Therefore, the connecting rod is not able to fully deliver a peak (shock) force to the crank pin 44 and shaft segments 26. The vertical (radial) loads on shaft segments 26 have relatively low peak values, so that the force-transmitting link 52 can be relatively short (as viewed in FIG. 2) without reducing the expected service life of the engine.

As previously noted, a principal aim of the invention is to achieve relatively high force delivery effectiveness percentages, particularly during the power stroke. Following is a tabulation of force delivery effectiveness valuations previously discussed.

| Crank Pin Position | Conventional Structure FIG. 15A-D | Invention Structure FIG. 16A-D | Invention Structure FIG. 17A-D |
|---|---|---|---|
| 0 degrees | 0% | 40% | 57% |
| 10 deg. ATDC | 23% | 57% | 67% |
| 20 deg. ATDC | 43% | 73% | 77% |
| 30 deg. ATDC | 60% | 80% | 87% |
| 40 deg. ATDC | 73% | 87% | 90% |
| Average | 40% | 67% | 75% |

It can be seen from the comparative values that the invention structure can produce a more efficient delivery of the piston energy to the crankshaft, as compared to the force delivery effectiveness of the conventional piston engine. This more efficient delivery of the piston energy could lead to lessened fuel consumption and/or greater engine torque.

Figure 18:
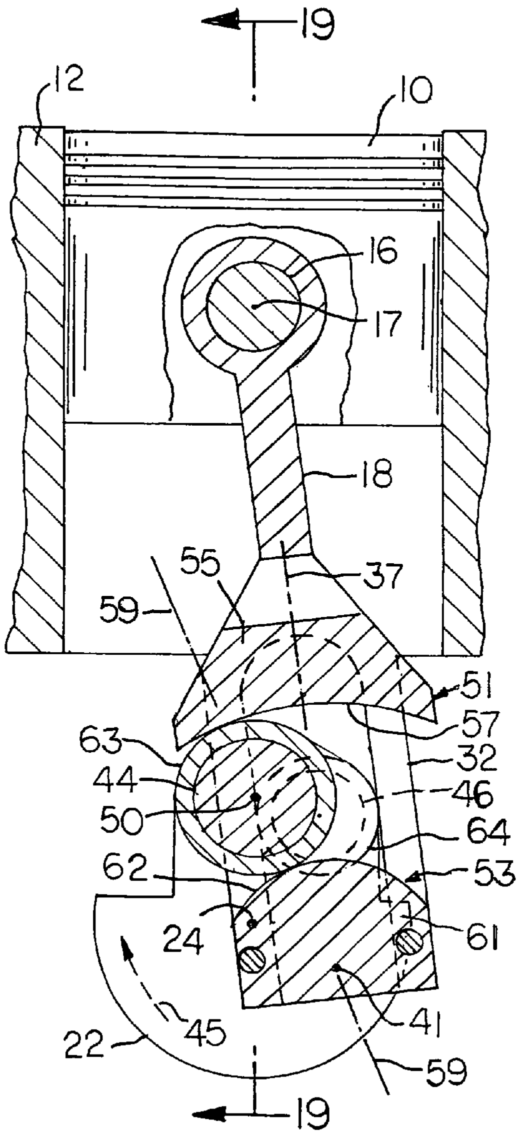
FIG. 18 is a sectional view taken in the same direction as FIG. 1, but showing another embodiment of the invention.
Figure 19:
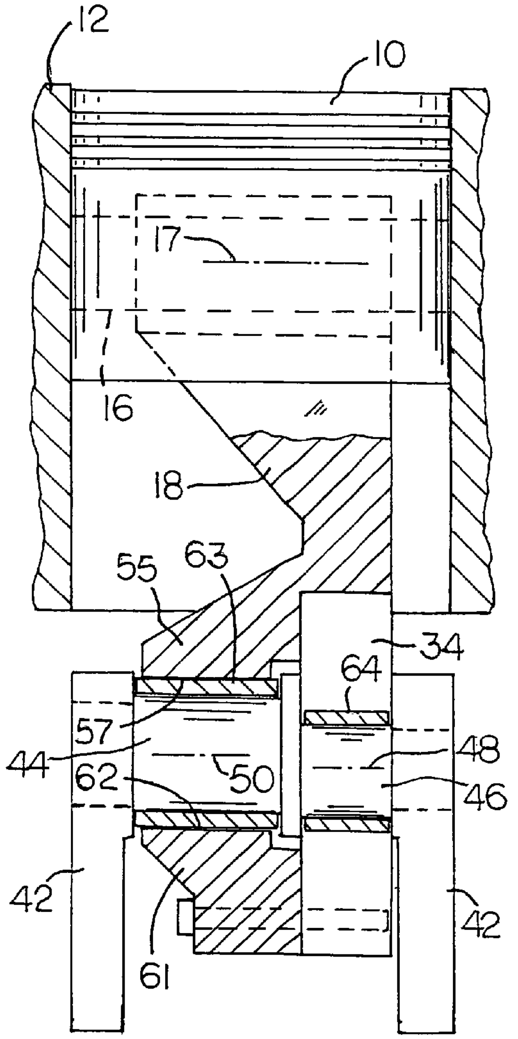
FIG. 19 is a sectional view taken on line 19-19 in FIG. 18.

FIGS. 18 and 19 show an alternate form that the invention can take. In this case the force-transmitting means 51 takes the form of an arcuate track of 53 that is centered on an axis 41. Axis 41 is a force-convergence point for force direction line 37 on connecting rod 18 and a second force direction line 59 extending through crank pin axis 50. Arcuate track 53 delivers an actuating force to crank pin 44 in essentially the same way as link 52 (FIG. 1).

Arcuate track 53 is defined by an upper block 55 having a concave arcuate surface 57, and a lower block 61 having a convex arcuate surface 62. Block 55 is permanently secured to connecting rod 18. Block 61 is releasably secured to rod 18, e.g. with machine screws. Arcuate surfaces 57 and 62 are centered on axis 41 to deliver force along force direction line 59 so that crankshaft 24 rotates around axis 22.

In the FIG. 18 construction, crank pin 44 has a roller sleeve 63, while guide pin 46 has a roller sleeve 64. Sleeve 63 rolls on block surfaces 57 and 62 to minimize frictional stress that could reduce the expected service life of crank pin 44. Similarly, roller sleeve 64 rolls on the guide surfaces of connecting rod arms 32 to minimize frictional stress. Roller sleeves 63 and 64 can be installed on pins 44 and 46 prior to the process of assembling the pins to crank arms 42. The roller sleeves are considered to be an optional feature.

Operationally, the FIG. 18 embodiment is similar to the FIG. 1 embodiment. The force-movement relationships depicted in FIGS. 16A-16D are applicable not only to the FIG. 1 embodiment, but also to the FIG. 18 embodiment.

A principal advantage of the invention is the relatively high force delivery effectiveness percentage achieved by delivering the piston energy to crank pin 44 along force direction line 59 (FIG. 16), rather than along force direction line 72 (FIG. 15).

What is claimed:

1. A four cycle engine comprising a slidable piston, a crankshaft having a rotational axis, a connecting rod operatively connecting the crankshaft to the piston; said crankshaft comprising a crank pin and a guide pin rotatable as a unit around the crankshaft rotational axis, each pin having an axis; said connecting rod having a pivotal connection with the piston and a linear slidable connection with said guide pin; and a force transmitting means connecting said crank pin to said connecting rod; said connecting rod having a first force direction line extending through said pivotal connection and the guide pin axis; said force transmitting means having a second force direction line extending through the crank pin axis and a force convergence point on the connecting rod force line remote from the piston pivotal connection.

2. The combination of claim 1, wherein said crank pin and said guide pin are contiguous, said crank pin and said guide pin being spaced the same radial distance from the crankshaft rotational axis.

3. The combination of claim 2, wherein said guide pin leads the crank pin, measured in the direction of crankshaft rotation.

4. The combination of claim 3, wherein the lead angle of the guide pin measures approximately thirty degrees.

5. The combination of claim 1, wherein said force-transmitting means comprises a link member having a swivel fit on the crank pin and a hinged connection with the connecting rod.

6. The combination of claim 1, wherein said force-transmitting means comprises an arcuate track centered on said force-convergence point; said arcuate track being movable on said crank pin.

7. The combination of claim 1, wherein said crank pin and said guide pin are contiguous, said crank pin and said guide pin being spaced a common radial distance from the crank shaft rotational axis; said guide pin leading the crank pin by approximately thirty degrees measured in the direction of crankshaft rotation; said force-transmitting means comprising a link member having a swivel fit on the crank pin and a hinged connection with the connecting rod.

8. A four cycle engine comprising a combustion cylinder, a gas-powered piston slidable back and forth in said cylinder; a crankshaft having a circular crank pin and a circular guide pin movable as a unit around a crankshaft rotational axis; a connecting rod operatively connecting said piston to said crankshaft; said connecting rod having first and second ends, said connecting rod having a pivotal connection to said piston at said first end, and a linear trackway movable on said guide pin, whereby the guide pin and aforementioned pivotal connection jointly determine the orientation of the connecting rod relative to the piston; and a force-transmitting means connecting said crank pin to said connecting rod; said connecting rod having a first force direction line coincident with said linear trackway; said force-transmitting means having a second force direction line that extends through the crank pin axis and a force-convergence point proximate to the second end of the connecting rod.

9. The combination of claim 8, wherein said crank pin and said guide pin are spaced a common radial distance from the crankshaft rotational axis.

10. The combination of claim 9, wherein the guide pin leads the crank pin, measured angularly around the crankshaft rotational axis.

11. The combination of claim 10, wherein the lead angle of the guide pin measures approximately thirty degrees.

12. The combination of claim 9, wherein said force-transmitting means comprises a link member having a swivel fit on the crank pin and a hinged connection with the connecting rod; said hinged connection having a hinge axis coincident with the aforementioned force-convergence point on the connecting rod force line.

13. The combination of claim 9 wherein said force-transmitting means comprises an arcuate track centered on said force-convergence point; said arcuate track being movable on said crank pin.

* * * * *